US008356704B2

(12) United States Patent
Flessas

(10) Patent No.: US 8,356,704 B2
(45) Date of Patent: Jan. 22, 2013

(54) ROBOTICALLY CONTROLLED ENTERTAINMENT ELEMENTS

(76) Inventor: Andrew Flessas, Las Vegas, NV (US)

(*) Notice: Subject to any disclaimer, the term of this patent is extended or adjusted under 35 U.S.C. 154(b) by 153 days.

(21) Appl. No.: 12/653,058

(22) Filed: Dec. 7, 2009

(65) Prior Publication Data
US 2010/0140046 A1 Jun. 10, 2010

Related U.S. Application Data

(63) Continuation-in-part of application No. 12/455,638, filed on Jun. 3, 2009, now abandoned, which is a continuation of application No. 11/700,535, filed on Jan. 30, 2007, now Pat. No. 7,545,108.

(60) Provisional application No. 60/763,669, filed on Jan. 31, 2006.

(51) Int. Cl.
B65G 43/00 (2006.01)
(52) U.S. Cl. .................... 198/322; 198/321
(58) Field of Classification Search .............. 198/321, 198/322
See application file for complete search history.

(56) References Cited

U.S. PATENT DOCUMENTS

| | | | |
|---|---|---|---|
| 4,868,473 A * | 9/1989 | Kato ..................... 700/254 |
| 5,496,086 A * | 3/1996 | Adrian et al. ............. 294/65 |
| 5,628,660 A | 5/1997 | Onitsuka |
| 5,708,527 A | 1/1998 | Adamson et al. |
| 5,909,998 A | 6/1999 | Herbermann et al. |
| 5,947,429 A | 9/1999 | Sweere et al. |
| 6,046,711 A | 4/2000 | Kouchi |
| 6,085,670 A | 7/2000 | Genov |
| 6,212,784 B1 | 4/2001 | Pittman |
| 6,328,206 B1 | 12/2001 | Schanz et al. |
| 6,427,823 B1 * | 8/2002 | Ishikawa et al. ............. 198/330 |
| 6,437,973 B1 | 8/2002 | Helot et al. |
| 6,708,940 B2 * | 3/2004 | Ligertwood .................. 248/324 |
| 6,826,963 B2 | 12/2004 | Liu et al. |
| 7,022,962 B2 * | 4/2006 | Ohtomo et al. ............. 250/206.1 |
| 7,043,335 B2 * | 5/2006 | Yoshida et al. .............. 700/195 |
| 7,163,249 B2 * | 1/2007 | Schmidt et al. ............ 296/37.12 |
| 7,414,603 B2 | 8/2008 | Tseng |
| 7,463,821 B2 * | 12/2008 | DiFrancesco et al. ........ 386/342 |
| 7,500,550 B2 * | 3/2009 | Strong et al. ............... 198/347.1 |
| 7,545,108 B2 * | 6/2009 | Flessas ........................ 318/101 |
| 7,559,766 B2 * | 7/2009 | Epley et al. ..................... 434/34 |
| 7,576,830 B2 * | 8/2009 | DiFrancesco ................... 352/44 |
| 7,719,222 B2 * | 5/2010 | Theobald ................. 318/568.12 |
| 2004/0202445 A1 | 10/2004 | DiFrancesco |
| 2004/0249507 A1 * | 12/2004 | Yoshida et al. ............. 700/245 |
| 2006/0061124 A1 | 3/2006 | Schmidt et al. |

* cited by examiner

Primary Examiner — Joseph A Dillon, Jr.
(74) Attorney, Agent, or Firm — Weide & Miller, Ltd.

(57) ABSTRACT

A robotic mount is configured to move an entertainment element such as a video display, a video projector or a staircase. The robotic mount is movable in three-dimensions, whereby the associated entertainment element is moveable in three-dimensional space. In one embodiment, a unitary display comprises a plurality of closely spaced individual displays which are mounted to robotic mounts, whereby the configuration of the unitary display may be altered by changing the position of one or more of the displays relative to the others.

9 Claims, 5 Drawing Sheets

ROBOTICALLY CONTROLLED ENTERTAINMENT ELEMENTS

RELATED APPLICATION DATA

This application is a continuation-in-part of U.S. application Ser. No. 12/455,638, filed Jun. 3, 2009 now abandoned, which is a continuation of U.S. application Ser. No. 11/700,535, filed Jan. 30, 2007, now U.S. Pat. No. 7,545,108, which claims priority to U.S. Provisional Patent Application Ser. No. 60/763,669 filed Jan. 31, 2006.

FIELD OF THE INVENTION

The present invention relates to the movement of entertainment elements.

BACKGROUND OF THE INVENTION

A wide variety of devices are used for entertainment purposes. For example, electronic displays are now extremely common and are utilized in a variety of environments. Such displays were initially used primarily in television sets and to with computers. Initially, these displays were primarily CRT type displays which were large and bulky.

In recent years, other display technologies have been developed. Plasma, LCD, LED and other types of displays are now commercially producible in large display sizes. At the same time, however, these displays are generally thin, thus taking up much less space than CRT type displays offering the same display area.

As such, these displays are now utilized for a variety of purposes. For example, large displays are used at stadiums to present replays of sporting events. These types of displays are also sometimes mounted to walls in stores to present advertising information.

In order to attract attention to advertising, graphic information may be presented on the displays. This information may comprise exciting patterns, such as in bright colors, flashing effects and the like, to draw attention to the display. Still, these displays may be overlooked and advertisers and other users of these displays continue to seek new ways to use these displays and increase their viewership.

Other types of entertainment devices may be used in other settings. For example, in a theatrical production, large props may be located on a stage. The props may be moved into various positions to create different scenes and various actions. The props are often moved manually, such as with ropes and pulleys, limiting the situations where they may be used or their effectiveness.

SUMMARY OF THE INVENTION

The invention comprises moveable entertainment elements and methods of moving one or more entertainment elements.

One embodiment of the invention is a robotic mount. The robotic mount is configured to support one or more entertainment elements and move the one or more entertainment elements in at least two dimensions or directions, and preferably in three-dimensions. In one embodiment, the robotic mount comprises a base and a movable support. The base supports the display support, such as by resting upon a support surface or by connection to a support, such as a wall or other element.

The moveable support is movable in at least two, and preferably three, dimensions, or directions whereby one more entertainment elements connected thereto are so movable. In one embodiment, the moveable support comprises a plurality of members which are movably connected to one another in one more directions/dimensions. The moveable support may comprise, for example, a robotic arm having a base, a main support which is rotatable relative to the base, a lower arm which is rotatable relative to the main support, an upper arm which is rotatable relative to the lower arm, and a head to which the one or more entertainment elements are connected, the head movable relative to the upper arm.

In one embodiment, means are provided for moving the moveable support. Preferably, the means permits the moveable mount to be "automated" in the sense that it can be moved without direct physical contact by a human therewith. This means may comprise one or more electric motors or the like.

One aspect of the invention is a robotically controlled electronic display. The robotically controlled electronic display preferably comprises a robotic mount which supports and moves one or more electronic displays. The electronic displays may comprise, for example, flat panel electronic video displays.

In another embodiment of the invention, a unitary display may comprise two or more individual displays. One or more robotic mounts may be utilized to move one or more or all of the displays of the unitary display. For example, each display of a unitary display comprising a plurality of displays may be associated with its own robotic mount, thus permitting all of the displays of the unitary display to be moved independently and/or synchronously.

Another aspect of the invention comprises a robotically controlled video projector. The robotically controlled video projector comprises a robotic mount which support and moves one or more video projectors. The video projectors may comprise, for example, CRT or DLP type electronic video projectors. The robotic mount may move the one or more projectors to cause then to display information, images, moving images or the like upon various display surfaces such as screens, walls or floors.

Yet another aspect of the invention comprises a robotically controlled staircase. The robotically controlled staircase comprises a robotic mount which supports and moves a staircase. The staircase preferably defines one or more steps from a bottom end to a top end. The robot mount is preferably configured to move the staircase in three-dimensional space, such as from ground level to one or more raised platforms.

One embodiment of the invention is a system including a robotic mount and a controller. The controller may be configured to accept input from a user and/or run control programs for generating instructions or output signals which may be used to control the robotic mount and its associated entertainment element (such as its associated video display(s), video projector(s) or staircase). In one embodiment, such a controller may also be configured to control information displayed by the one or more video displays or video projectors, including synchronizing the movement thereof with the images displayed thereby.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention comprises one or more robotically-controlled objects and objects which are moved by one or more robots, such as electronic displays or projectors or a staircase. One embodiment of the invention is a robotically controlled electronic display and methods of using robotically controlled electronic displays, such as methods of moving one or more electronic displays of a group of displays. Another embodiment is a robotically controlled video projector and methods of using robotically controlled projectors to display images. Yet another embodiment of the invention is a robotically controlled staircase and methods of moving a staircase using one or more robots.

Figure 1:
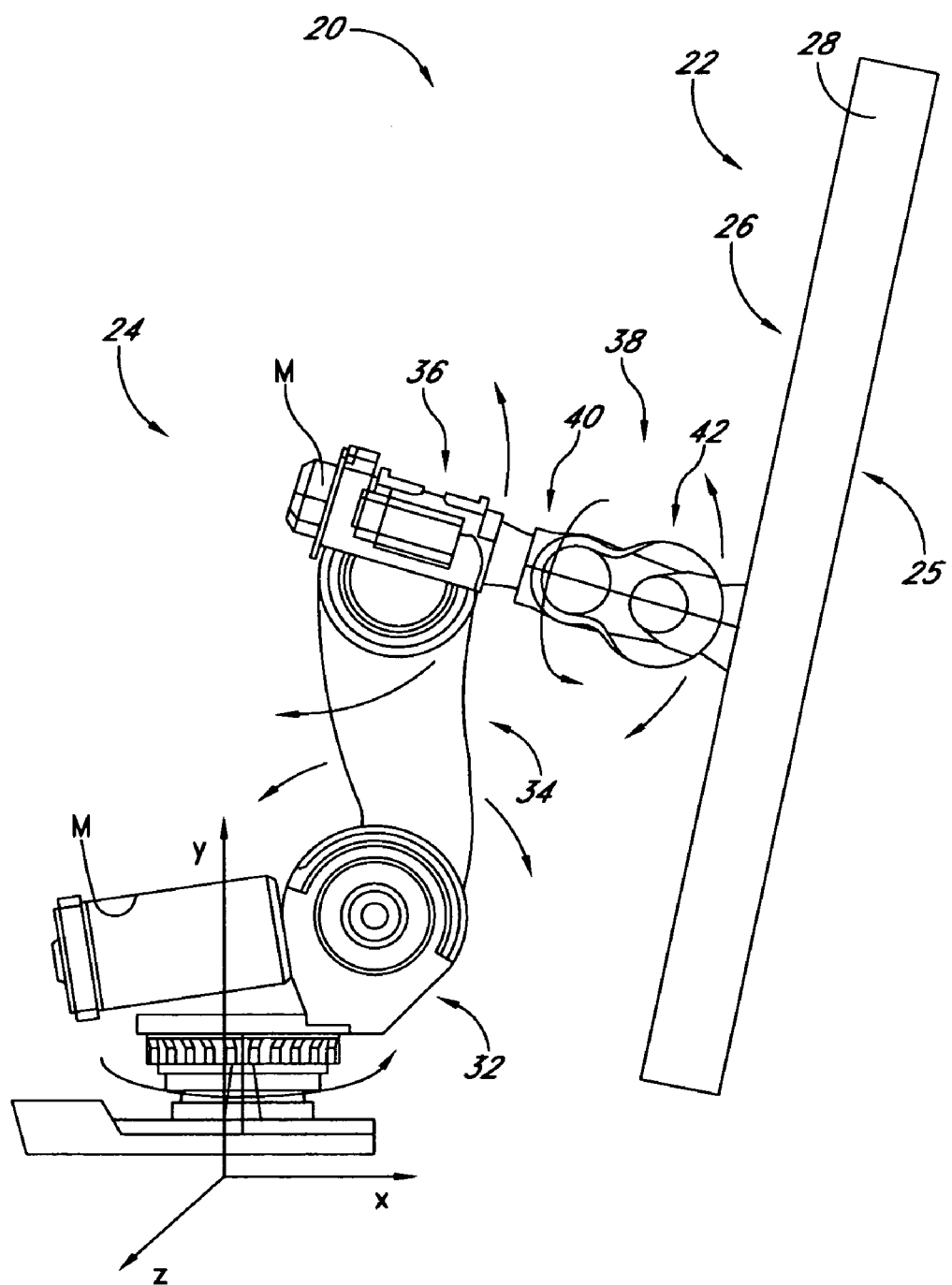
FIG. 1 is a side view of a robotically controlled electronic display in accordance with an embodiment of the invention.

FIG. 1 illustrates a robotically controlled electronic display 20 in accordance with an embodiment of the invention. As illustrated, the robotically controlled electronic display 20 comprises at least one electronic display 22 and a robotic or moveable display mount 24. In a preferred embodiment, the electronic display 22 is a thin-panel type display, such as an LCD, LED, plasma or similar display (whether now known or later developed). In one embodiment, the electronic display 22 has a front or viewing side 25 and an opposing rear side 26. The electronic display 22 has a peripheral edge 28.

In one embodiment, the electronic display 22 is generally rectangular in shape, but the display 22 may have a variety of shapes. The electronic display 22 may have a display area at the front side 25, which display area is enclosed by a bezel, frame or the like. The display area comprises the portion of the electronic display 22 which is capable of displaying information.

In a preferred embodiment, the electronic display 22 is relatively large, such as for viewing by person situation remotely there from. The electronic display 22 may be 20 inches in diagonal size (of display area), more preferably at least 36 inches in diagonal size, and even more preferably a least 50-60 inches or more in diagonal size.

The electronic display 22 is supported by the robotic mount 24. In a preferred embodiment, the robotic display mount 24 is moveable, thus permitting the position of the electronic display 22 to be changed. In a preferred embodiment, the robotic mount 24 is referred to as "robotic" because it is a device which can change positions without direct manual input. In particular, the robotic mount is preferably capable of multiple movements without manual intervention (i.e. move between various positions based upon a sequence of instructions without each movement being prompted by individual user input). Preferably, the robotic mount comprises a robot or robotic arm which can change the position of the display in at least two (2), and preferably three (3), dimensions or directions.

FIG. 1 illustrated one embodiment of a robotic mount 24. In one embodiment, the robotic mount 24 comprises a base and a display support. The base is configured to connect or support the display mount and associated display to a support, and the display support is preferably movable relative to the base, thus permitting an associated display to be movable relative to the base and the associated support.

Referring to FIG. 1, the base 30 may have a variety of configurations, including various shapes and sizes. In general, the base 30 is configured to be mounted to or supported by a support surface, such as a wall, floor or other support, such as a portion of another object. The base 30 may have a generally planar bottom or lower surface for engaging a generally planar support surface, or may have other configurations for engaging support surfaces of other shapes. In one embodiment, the base 30 may include one or more apertures for accepting fasteners which are placed into engagement with the support surface, for securing the base 30 in a fixed position by temporarily or permanently connecting the base 30 to that surface.

In a preferred embodiment, a movable support is positioned between the base 30 and the electronic display 22. This support is preferably moveable in at least two (2), and more preferably three (3), dimensions. By "two" or "three-dimensions" it is preferably meant the standard Cartesian two or three-dimensional space, such that the support is capable of moving the display about, or relative to, at least two of an "x", a "y" and a "z" axis.

As illustrated, in one embodiment, the robotic arm includes a main support 32. In one embodiment, the main support 32 is mounted for rotation relative to the base 30, i.e. about the "y"-axis as illustrated in FIG. 1. The main support 32 may be mounted, for example, on a bearing supported shaft which is connected to the base 30, or by other means.

In one embodiment, a lower arm 34 is rotatably mounted to the main support 32. As illustrated, the main support 32 has a first portion mounted to the base 30 and a second portion to which the lower arm 34 is mounted. In a preferred embodiment, the lower arm 34 is rotatably mounted to the main support 32 about a shaft or other mount. In the configuration illustrated, the lower arm 34 is mounted for rotation about a "z"-axis (i.e. an axis which is generally perpendicular to the axis about which the base 30 rotates).

As further illustrated, an upper arm 36 is rotatably mounted to the lower arm 34. In one embodiment, a first or distal portion of the lower arm 34 is mounted to the main support 32, and the upper arm 36 is mounted to a top or proximal portion of the lower arm 34. In one embodiment, the upper arm 36 is also mounted for rotation about the "z" axis.

In one embodiment, a head 38 is located at a distal portion of the upper arm 36. Preferably, the display 25 is mounted to the mount 24 via the head 38. In one embodiment, the head 38 is mounted for rotation relative to the upper arm 36 (and thus the remainder of the mount 24). In one configuration, a first portion 40 of the head 38 is mounted for rotation about an "x" axis relative to the upper arm 36 (i.e., about an axis which is perpendicular to both the "y" and "z" axes, and thus about an axis which is generally perpendicular to the axis about which the main support 32 and upper and lower arms 36, 34 rotate).

Further, in the embodiment illustrated, a second portion 42 of the head 38 is mounted for rotation relative to the first portion 40 and the upper arm 36, about the "z"-axis. As illustrated, the display 22 is mounted to the second portion 42 of the head 38.

The various portions of the mount 24 may be connected to one another in a variety of fashions. For example, the various portions may be connected to one another via a shaft and bearing mount, where the shaft is connected to one component and engages one or more bearings supported by the other component, such that the shaft may move relative to the bearing(s), thus permitting the components to move relative to one another. The portions of the mount 24 might be mounted to one another in other fashions, however, such as by hinged mounting or the like.

Preferably, the mount 24 includes means for moving the one or more portions thereof, and thus the display 22 connected thereto. As illustrated, the mount 24 may include one or more motors M for moving the components thereof. The motors M may be electrical motors. In other embodiments, hydraulics or other means may be utilized to move one or more of the components of the mount 24. For example, a hydraulic arm might be utilized to move the upper arm 36 relative to the lower arm 34 in an up and down direction.

In one embodiment, the display 22 may be detachably connected to the mount 24, such as to permit the display 22 to be changed or serviced. The display 22 might be connected to a supporting frame, for example. That frame might then be connected to the mount 24, such as by connecting the frame to the head 38 with one or more fasteners.

As indicated, in a preferred embodiment, the mount 24 is configured to move the display 22 in three-dimensions, or combinations thereof. The particular configuration of the mount 24 may vary for accomplishing this task. For example, while the mount 24 described above is "redundant" in its capacity to move in certain directions (i.e. the upper and lower arms 36,34 are both configured to move about the "z" axis), the mount 24 could be configured in other fashions (such as by having only a single portion configured to move in each direction). It will also be appreciated that the number of members or elements which the display mount comprises may vary. For example, the display mount might comprise a base and a head which is mounted to the based, such as via a swivel, permitting the head to be moved in at least two dimensions. Various configurations of members may also be utilized to effect movement in various directions. For example, aside from swivels or the rotating connections of the display mount illustrated in FIG. 1, members may be configured to telescope, slide or otherwise move linearly (i.e. move along an axis rather than about an axis), or be configured to move along paths other than curved paths. For example, the mount 24 may be configured to move about the "x" axis, such as to permit the display to be tilted up and down, to move about the "y" axis, such as to permit the display to be swiveled from side to side, and to simply move along the "z" axis, such as to permit the display to be moved in and out (such as towards or away from a wall/viewer).

In the embodiment illustrated, a single display 22 is connected to a single mount 24. In another embodiment of the invention, referring to FIG. 2, a unitary display 122 may comprise a plurality of individual or independent displays 22 located in proximity to one another. In one embodiment, one or more of those individual displays 22 may be mounted to a mount 24, and thus be configured for movement.

Figure 2:
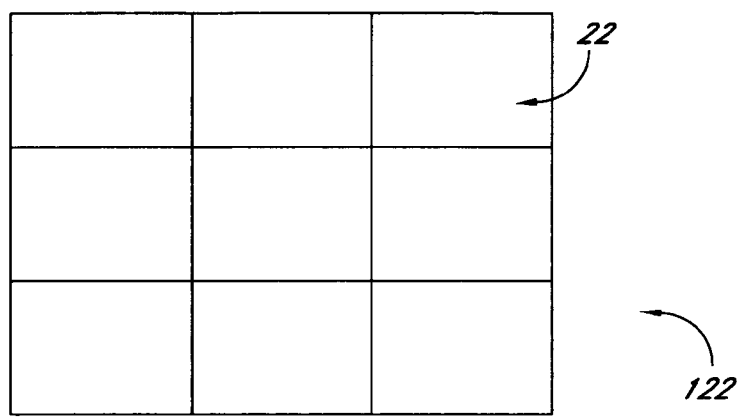
FIG. 2 illustrates a robotically controlled unitary display comprising a plurality of individual displays in accordance with another embodiment of the invention.

FIG. 2 illustrates one embodiment of a unitary display 122 comprising nine (9) displays 22. All nine displays 22 are preferably mounted to an associated mount (not shown). In this manner, each of the nine displays 22 may be moved by their associated mount.

FIG. 2 illustrates the displays 22 in an orientation where they are located adjacent to one another in a matrix, and in a common plane. In the configuration illustrated, there is a central display surrounded by top, bottom, side and corner displays.

Figure 3:
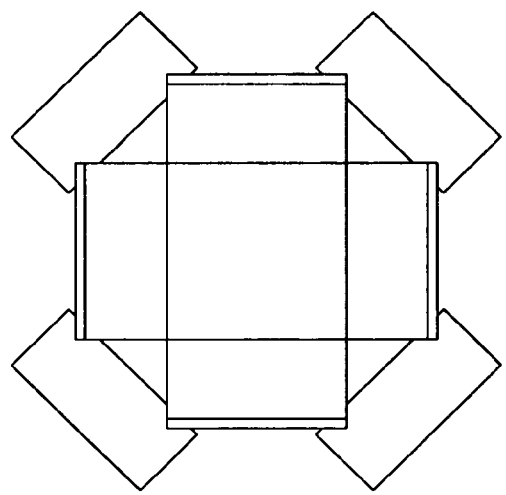
FIG. 3 illustrates the unitary display of FIG. 2 with various of the individual displays moved into different positions.

The displays 22 may be moved, however, to other locations and thus other orientations or positions relative to one another. For example, FIG. 3 illustrates the displays 22 in a "flower" configuration where the top, bottom and side displays are tilted forward relative to the plane which contains the central display. The corner displays are rotated and then similarly tilted inwardly. In this configuration, the displays are positioned like the slightly closed pedals of a rose or other flower.

Figure 4:
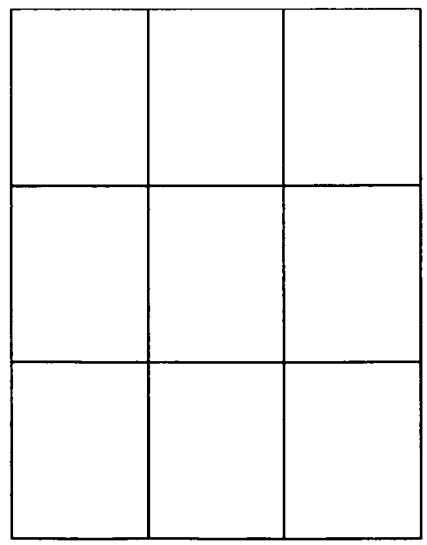
FIG. 4 illustrates the unitary display of FIG. 2 with the individual displays moved into different positions.
Figure 5:
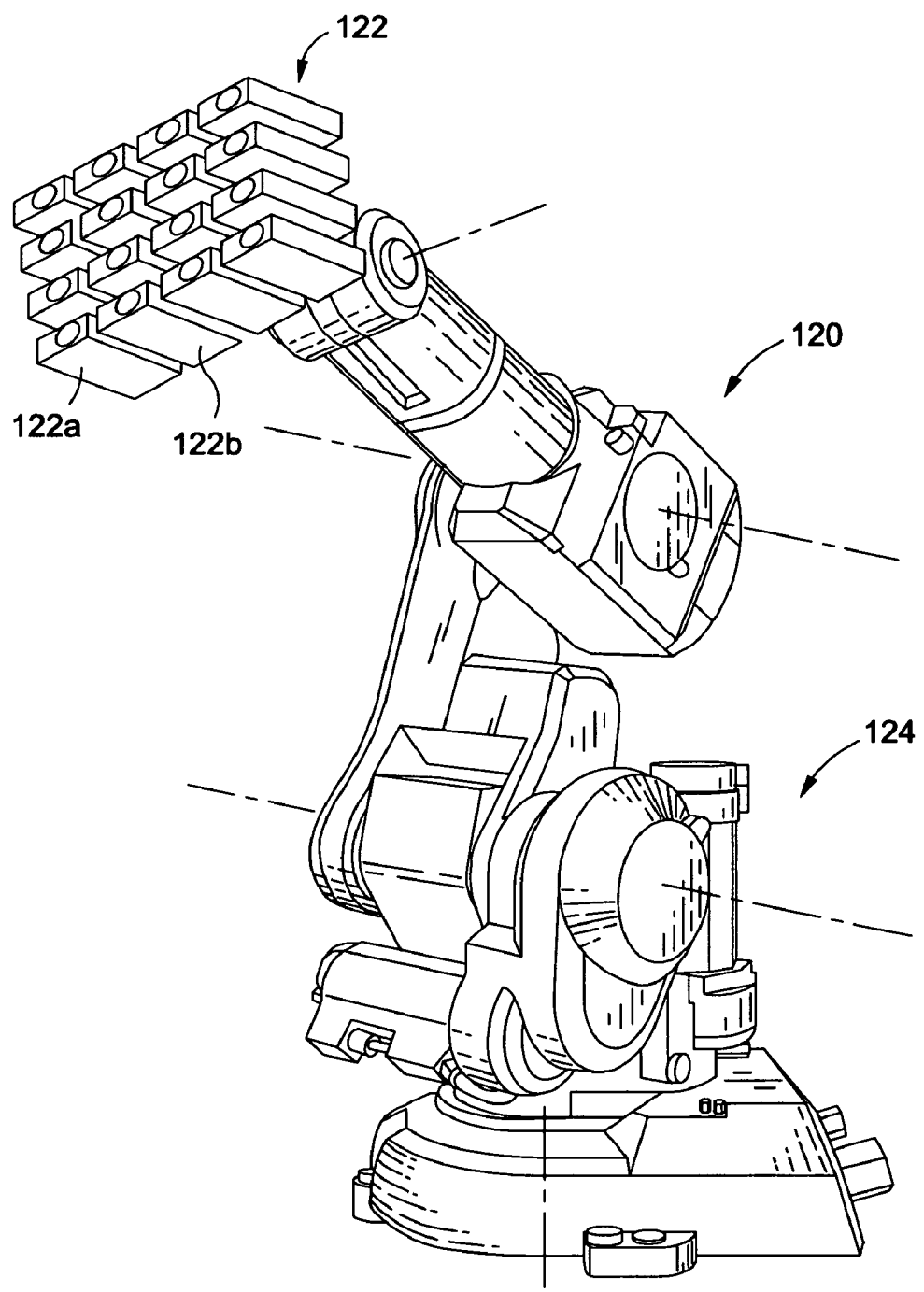
FIG. 5 illustrates a robotically controlled video projector in accordance with an embodiment of the invention.

FIG. 4 illustrates the displays 22 again arranged in a matrix and in a single plane. However, in this configuration, the displays 22 have all been rotated 90 degrees, so that the unitary display 122 is taller than wider.

In one embodiment, each display 22 of the unitary display 122 has an associated robotic mount. In this manner, each display 22 may be moved independently of the other. In another embodiment, multiple displays may be coupled to or otherwise associated with a single mount (such that groups of displays are movable together). In yet another embodiment, one or more of the displays 22 may be fixed and others may be connected to a mount 24 for movement.

In one embodiment, means may be provided for controlling a single mount (such as illustrated in FIG. 1) or one or more or all of a plurality of mounts associated with a unitary display (such as illustrated in FIG. 2). In one embodiment, one or more mounts may be controlled by a controller. The controller might comprise, for example, an electronically or mechanically operated controller.

In a preferred embodiment, the controller may comprise or include a computing device. Various instructions may be provided from the controller to the one or more robots/robotic mounts, causing the robots/robotic mounts to move. For example, a user might provide an input to the controller, which input is a request to move a particular display from a first to a second position. The controller may generate one more signals or instructions which are transmitted to the required mount for causing the mount to so move the display. The signal might comprise opening of a switch which allows electricity to flow to one or more motors for a predetermined period time which is necessary for the motor to effect the desired movement. In another embodiment, the signal might comprise an instruction which is received by sub-controller of the mount, which sub-controller then causes the mount to move as desired.

In one embodiment, the controller may be configured to cause a single mount or multiple mounts to move in various patterns or other desired directions. For example, the controller might be programmed to cause the displays to move in a particular pattern. Referring to FIGS. 2-4, for example, the controller may be configured to move the displays from the position illustrated in FIG. 2 to that illustrated in FIG. 3 or 4, or vice versa. The controller may be custom-programmed or might be configured to execute pre-set sequences of movement. For example, the displays may be configured to move at certain times, into certain positions or in certain patterns, to move with music or the like (such music might be presented via speakers associated with the display or via a separate sound system or the like).

In one embodiment, the controller may include a processing unit capable of executing machine readable code or "software." As indicated, that software may comprise a set of instructions which, when executed, cause the controller to move one or more displays in a predetermined motion or pattern, randomly or otherwise. The software might also or instead simply comprise a set of instructions which permits a user to provide manual input to cause a display or displays to move, either in direct response thereto or to generate a "programmed" movement (which may be implemented immediately or be stored for implementation at a later time).

The controller might communicate with the robotic mount via wired or wireless communications. For example, the controller might comprise a desk-top computer running a control program. The desk-top computer might transmit signals via a RS-232 communication link including a wired pathway to the motor or controller of the robotic mount. Alternatively, the desk-top computer and display mount controller might both include wireless transceivers. In this manner, the controller and robotic mount(s) may be located remotely from one another. The same computer might output images or a video feed to the one or more displays.

In one embodiment, video information may be transmitted to the display or displays either independently of control instructions or dependently therewith. For example, the controller may be configured to both generate display information and/or transmit display information to the displays, and control the mounts. The controller might be configured to move the mounts/displays based upon the information which is displayed by the one or more displays. In one embodiment, the one or more displays may be moved synchronously with information displayed by the displays. For example, the displays might be moved synchronously with images displayed by the displays or with music or other accompanying information.

The invention has numerous advantages. One aspect of the invention is a movable display. The display may preferably be moved in three-dimensions (i.e. about three axes which are all perpendicular to one another). In one embodiment, the display is mounted to a display mount having a display support which is movable in three dimensions. Preferably, means are provided for automatically or remotely moving the display. As indicated, this may comprise changing the position of one or more portions of the robotic mount.

One aspect of the invention is a method of remotely or automatically changing the position of a display. For example, a display may be mounted to a wall or ceiling in a public area and the position of that display may be changed at various times in an automatic fashion (as opposed to "manual" manner, where the position is changed by a person physically moving the display or its associated mount). This has the advantage that the position of a display may be moved for various purposes, such as for entertainment, for optimizing viewing angle, for directing information to viewers in certain locations or areas, or for other reasons. The display might also be mounted to a wall of a home and be controlled by a user to change the viewing position of the display.

Figure 6:
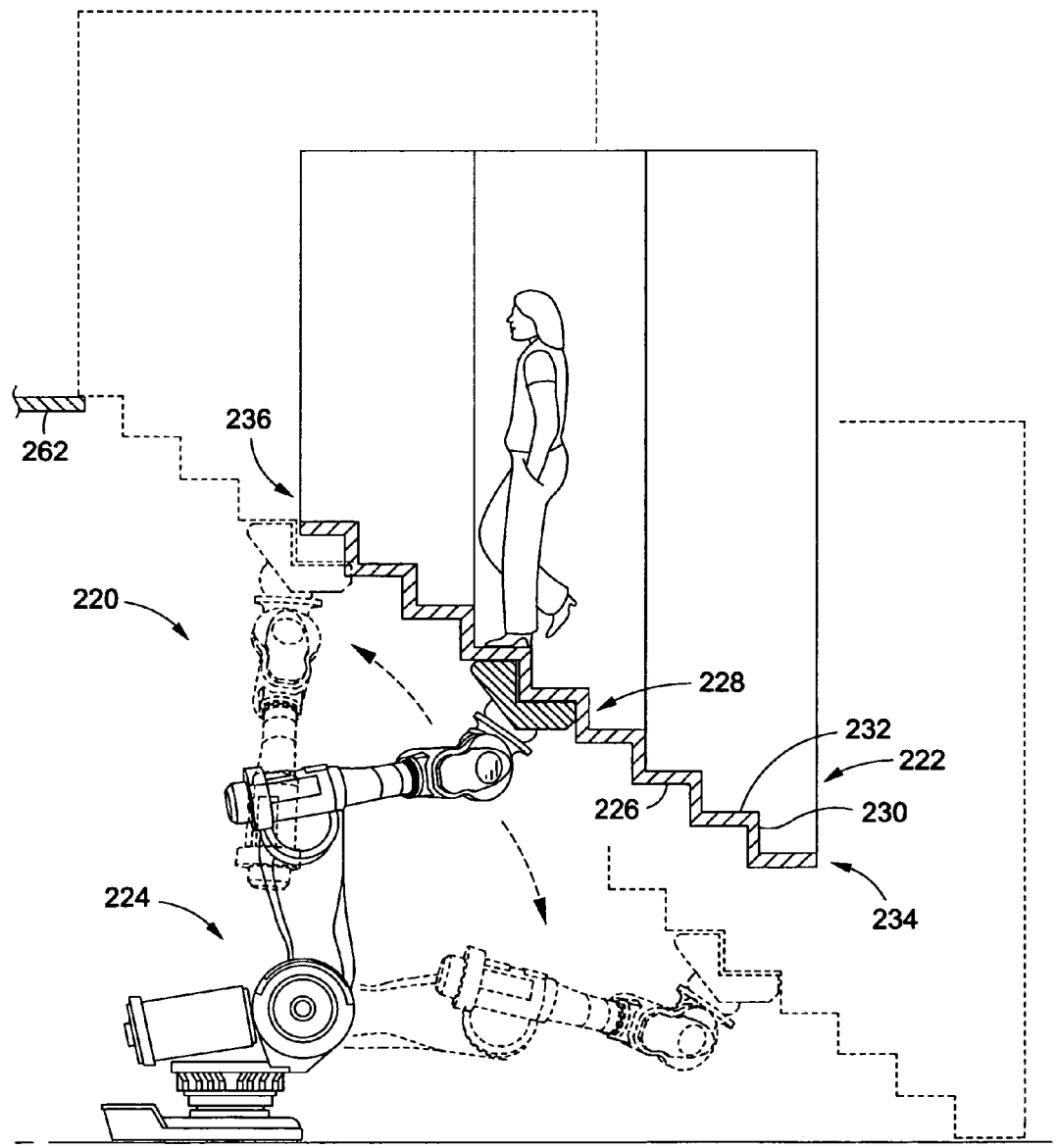
FIGS. 6 and 7 illustrate a robotically controlled staircase in accordance with an embodiment of the invention.

Another embodiment of the invention is a robotically controlled projector 120. FIG. 6 illustrates one embodiment of a robotically controlled projector 120. Preferably, the robotically controlled projector 120 comprises at least one projector 122 and at least one robotic mount 124. The projector 122 may be of a variety of types now known or later developed. Preferably, the projector 120 is configured to project one or more images or a sequence of images (video) onto one or more surfaces. For example, the projector 120 might comprise a digital light processing ("DLP") projector, a CRT, LCD, or other type of projector. In one embodiment, the robotically controlled projector 120 includes a single projector. However, as illustrated, it might include a number of projectors 122a, 122b, etc.

The robotic mount 124 preferably comprises a robot or robotic arm similar to that described above and will thus not be described herein again in detail. In particular, the robotic mount 124 is configured to move the at least one projector 122 in at least two (2), and preferably three (3) dimensions. As also indicated above, the robotically controlled projector 120 may also include a controller. The controller may be configured to cause the projector 122 to display images or video at certain times, and may be configured to cause the robotic mount 124 to move the projector 122, such as in certain paths.

The projector 122 is preferably mounted to the robotic mount 124. The mount 124 may be used to move the projector 122, thus causing the projector 122 to display images or video at various locations. For example, a robotically controlled projector 120 might be located in a lobby and be used to display various information or images upon a screen or another projection surface such as a wall, a floor or the like. The robotically controlled projector 120 might be used in a theater to project background images or the like.

It will be appreciated that, like the robotically controlled display described above, more than one robotically controlled projector 120 might be used in tandem. For example, two robotically controlled projectors 120 might each have a single projector 122. The two robotically controlled projectors 120 may be configured to move in various patterns together or independent of one another, such as to show joint images, synchronous images or the like.

Of course, various other of the features of the robotically controlled display 20 described above may be applied to the robotically controlled projector 120.

Figure 7:
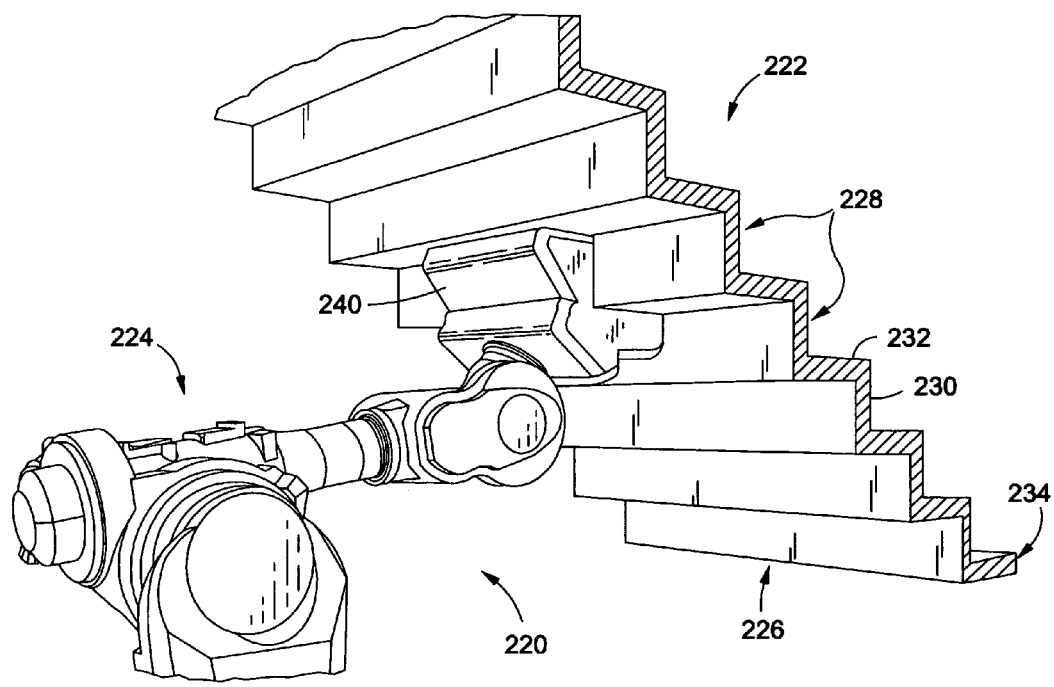

Yet another embodiment of the invention comprises a robotically controlled staircase 220. FIGS. 6 and 7 illustrate a robotically controlled staircase 220. The robotically controlled staircase 220 comprises a staircase 222 and a robot or robotic mount 224 which is configured to move the staircase 222.

The staircase 222 may have various configurations. In one embodiment, the staircase 222 comprises a supporting body or structure 226. The staircase 222 preferably includes a plurality of steps 228. Each step 228 may comprise a riser 230 and a landing 232. Each riser 230 preferably extends generally vertically upward. The number of steps 228, and thus the number of risers 230, may vary. Preferably, there is at least one step 228. More preferably, however, there are a plurality of steps 228. The depth of each landing 232 and the height of each riser 230 may be configured to conform to local building or other codes.

Preferably, the staircase 222 has a first or bottom end 234 and a second or top end 236. The top end 236 is preferably higher than the bottom end 234. The total change in elevation is dependent upon the number of steps 228 and the height of the risers 230. The staircase 222 may be straight or it might be spiral, have one or more bends or the like.

In one embodiment, the staircase 222 may be configured to mate with one or more other elements or structures. For example, the staircase 222 may be configured to dock or mate to a supporting platform (not shown). To this end, the top end 236 and bottom end 234 of the staircase 222 may end or terminate in a landing 232. This allows the top and bottom ends 236,234 to rest upon a supporting surface or platform at generally the same elevation thereof. In one embodiment, the landing at the top end 236 and/or bottom end 234 of the staircase 222 may be larger than the step landings 232. For example, each of the top and bottom end landings may be sufficiently large to permit one more persons to easily stand thereon (whereas the step landings are primarily configured to permit a user to simply step thereon as they climb the staircase).

In one embodiment, the staircase 222 may include other features. For example, the staircase 222 may include one or more handrails (not shown). The staircase 222 has a width between opposing sides. This width may vary, such as being 36 or 48 inches, for example. A handrail may be located at each side of the staircase to prevent a user from falling off of the staircase and to provide support to users. Likewise, the landing 232 at the top end 236 and bottom end 234 of the staircase 222 may include an enclosure. Such an enclosure may be selectively opened and closed to permit ingress to and egress from the staircase, but prevent such during movement of the staircase. Such an enclosure might comprise a rail, a chain, or the like. For example, a swinging gate may be located at both the top and bottom ends 236,234 of the staircase 222 to control ingress to and egress from the staircase 222.

In one embodiment, the body 226 of the staircase 222 might comprise a superstructure which supports the steps 228. For example, the body 226 might comprise a metal framework. The steps 228 might be constructed from wood and be supported by that framework. In another embodiment, the body 226 might define the steps 228. For example, the staircase 222 might be constructed from metal, such as step elements which are welded to one another to form a unitary structure.

The mount 224 preferably comprises a robot or robotic arm similar to that described above and will thus not be described herein again in detail (for example, such may comprise a base and a moveable support, as detailed above). In particular, the mount 224 is configured to move the staircase 222 in at least two (2), and preferably three (3) dimensions. As also indicated above, the robotically controlled staircase 220 may also include a controller to move the staircase 222 in certain paths.

As best illustrated in FIG. 7, the staircase 222 is preferably mounted to the mount 224. As illustrated, an adaptor 240 may be used to connect the staircase 222 and the robotic mount 224. The adaptor 240 may have various configurations. FIG. 7 illustrates one configuration in which the adaptor 240 engages a bottom portion of one or more of the steps 228. However, the adaptor 240 could have other configurations, such as depending upon the configuration of the staircase 222, including the body 226 or supporting structure thereof.

As illustrated in FIG. 6, the robotic mount 224 is configured to move the staircase 222 between various positions. For example, the robotic mount 224 may move the staircase 222 into a position in which its bottom end 234 is positioned on the ground. A user may then step onto the staircase 222 from the ground, such as by stepping onto a lower landing 232 thereof.

The robotic mount 224 may then be used to move the staircase 222, and the user standing thereon, to another location. In the preferred embodiment where the robotic mount 224 can move in three dimensions, the staircase 222 may be moved to various positions in three-dimensional space which vary from an initial or starting position. FIG. 6 illustrates one simplistic embodiment where the staircase 222 is moved in two dimensions: upwardly and forwardly. In this example, the staircase 222 may be moved upwardly and forwardly, such as to dock with a raised platform 262. A user might then disembark from the staircase 222 onto the platform 262.

It will be appreciated that a user may climb up and down the steps 228 of the staircase 222 both while the staircase 222 is stationary and/or while it is moving. For example, a user might board the staircase 222 at the bottom end 234 while it is stationary. As the staircase begins to move to a destination, the user might climb the steps 228 to the top end 236 of the staircase 222 to disembark the staircase 222 at the destination.

The robotically controlled staircase 220 might be used in various manners. For example, it might be used in a theater. In such an environment a singer might be transported from stage level to a platform well above stage, or from one location to another over a barrier such as a moat. The robotically controlled staircase 220 might also be used as an amusement ride. In such an embodiment, patrons might board the staircase 220 as a ride and be transported from one location to another. In one preferred embodiment, a haunted house ride might include one or more platforms in various locations. The platforms might lead to doors or other points of entry. Patrons might board the staircase and be transported to one or more of those platforms where they disembark to travel into other portions of the haunted house. In one embodiment, the staircase might move between various locations before stopping, thus providing substantial anticipation to the riders as to their final destination. It is also possible for there to be more than one robotically controlled staircase 220. The various staircases 220 might move independently between various locations. They might also move so that they join together at certain times (forming longer staircases to connect to various locations, for example) or independently at other times). As yet another example, a first robotically controlled staircase 220 might be used to move patrons from ground level to one or more platforms at a first level (above ground) and then a second robotically controlled staircase 220 might be used to move patrons from the first level to an even higher second level (or higher).

As indicated, one or more controllers may be used to control the robotically controlled staircase 220, such as to cause it to move between various locations. The patterns of movement may change over time. For example, in a haunted house ride, the robotically controlled staircase 220 might be configured to move a first set of riders from ground level to a first platform. However, the robotically controlled staircase 220 might be configured to move a second set of riders from that same ground level to a second, different platform.

Of course, the robotically controlled staircase 220 might be configured to move between various locations other than ground level and various platforms. The robotically controlled staircase 220 may include various of the other features detailed herein. For example, the robotically controlled staircase 220 may be controlled by one or more controllers, such as to move in certain patterns or paths, including synchronously with other elements. For example, the robotically controlled staircase 220 may be moved synchronously with music which is being played or with images that are being displayed.

In accordance with the invention, a robotic mount is advantageously configured to move one or more entertainment elements, preferably in three-dimensions. The entertainment elements may thus be "animated", providing a much higher level of entertainment value. For example, the movement of one or more video displays adds entertainment value to the information or images displayed by the one or more video displays. Likewise, the movement of one or more video projectors allows the location of projected images to change, thus adding excitement to the images themselves. Similarly, the movement of a staircase may be used to entertain observers or riders of the staircase.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A robotic staircase capable of transporting one or more users from a first location to a second location comprising:
    a robotic mount comprising:
        a base;

a moveable support connected to said base, said moveable support comprising at least a first portion, a second portion and a third portion, each of said first, second and third portions movable relative to one another and each portion moveable about at least one axis, whereby said moveable support is configured to move about each of an x axis, a y axis and a z axis which are all perpendicular to one another;

at least one motor configured to move said first, second and third portions of said moveable support;

an electronic controller configured to control said at least one motor to move said moveable support; and a staircase comprising a structure having a top end and a bottom end and at least two fixed steps therebetween which may be traversed up or down by a user to move between said top end and said bottom end, said top end being at an elevation which is higher than an elevation of said bottom end, said staircase mounted to said movable support of said robotic mount;

whereby said staircase is movable in the three dimensions about said x axis, y axis and z axis, permitting said staircase to be moved from at least a first location in which said top end or bottom end of said staircase is positioned adjacent to a first support, thus permitting said user to move between said staircase and said first support, and a second location in which said top end or bottom end is positioned adjacent to a second support, thus permitting said user to move between said staircase and said second support.

2. The robotic staircase in accordance with claim 1 said first portion of said moveable support comprises a main support rotatable relative to said base about at least said y axis, said second portion comprises an arm mounted to said main support and moveable about at least said z axis, and said third portion comprises a head mounted to said arm and moveable about at least said x axis.

3. The robotic staircase in accordance with claim 1 wherein staircase structure is mounted to said head of said moveable support.

4. The robotic staircase in accordance with claim 1 wherein said base is mounted to a floor of a structure.

5. The robotic staircase in accordance with claim 1 further including machine readable code executable by said electronic controller to cause said at least one motor to move said moveable support to move said staircase in a pre-selected pattern of movement in said three dimensions.

6. The robotic staircase in accordance with claim 5 wherein said machine readable code is configured to cause said controller to move said moveable support with music.

7. A movable staircase capable of transporting one or more users from a first location to a second location comprising:
   a robotic staircase mount, said robotic staircase mount comprising:
   a base;
   a moveable support connected to said base, said moveable support configured for movement relative to a first axis, a second axis, and a third axis, said first, second and third axes being perpendicular to one another;
   at least one motor configured to move said moveable support relative to said first, second and third axes; and
   a motor control configured to control said at least one motor;
   and
   a staircase having a top end and a bottom end and at least two steps there between which may be traversed up or down by a user to move between said top end and said bottom end, said staircase mounted to said moveable support of said robotic staircase mount, whereby said staircase is movable in three-dimensions by moving said robotic staircase mount, permitting said staircase to be moved from at least a first location in which said top end or bottom end of said staircase is positioned adjacent to a first support, thus permitting said user to move between said staircase and said first support, and a second location in which said top end or bottom end is positioned adjacent to a second support, thus permitting said user to move between said staircase and said second support.

8. The movable staircase in accordance with claim 7 wherein said moveable support comprises at least a first member movable about said first axis, at least a second member movable about said second axis, and at least a third member movable about said third axis.

9. The movable staircase in accordance with claim 7 wherein said moveable support comprises a main support connected to said base and movable relative to said base about said first axis, a lower arm connected to said main support and movable about said second axis, an upper arm connected to said lower arm and movable about said second axis, and a head mounted to said upper arm, said staircase mounted to said head and said head movable about at least said third axis.

* * * * *